3,649,438
NON-CURING THERMOSENSITIVE SEALANT TAPE

John Walker and Ronald Hindmarch McEuan, Sarnia, Ontario, Canada, assignors to Polymer Corporation Limited, Sarnia, Ontario, Canada
No Drawing. Filed Sept. 18, 1968, Ser. No. 760,686
Claims priority, application Canada, Oct. 3, 1967, 001,516
Int. Cl. B32b 5/16, 15/06, 15/08
U.S. Cl. 161—162        8 Claims

ABSTRACT OF THE DISCLOSURE

The invention provides thermosensitive compositions comprising an elastomeric polymer, a compatible resinous polymer, finely divided metal particles and optionally filler and plasticiser materials. The compositions are suitable for use in sealant tapes which comprise an electrically conducting core embedded in a matrix of the composition. Such sealant tapes are used to bond surfaces together by passing an electric current through the core to soften the matrix and by pressing the surfaces into the softened matrix.

---

The present invention relates to thermosensitive compositions which may be used in sealant tapes in the automotive industry.

The requirements for a good sealant tape, for example one to be used in the placement of automotive windshields, are many and various. In the first place the materials from which the sealants are made must provide for good cohesive strength and for good adhesion to a variety of surfaces such as glass, metal, enamel and wood. For tapes to be readily prepared the constituent materials should be easy to mix and the resultant composition should preferably be capable of easily controlled, smooth extrusion. Preferably also the materials should be of low cost and reprocessable. Sealant tapes conveniently have negligible self-tack for ease of handling and packaging and preferably have a long shelf life under conditions of normal temperature and pressure.

When used in the installation of automotive windshields, sealant tapes should have a degree of self-locating tack (by which is meant good adhesion after minimal pressure to primed surfaces), a low compression resistance and low recovery after compression.

For the sealants to provide a satisfactory bond between an automotive windshield and the windshield seat or aperture, the sealant should have a high yield and shear strength and should retain yield strength throughout the temperature range experienced in automotive operations. The sealant should be dimensionally stable and thus exhibit no sag or flow, should be weather resistant and ozone resistant, should not stain automotive enamel or bright metal finishes and should be compatible with paints.

From this summary of the desired properties, it can be seen that the requirements for a good sealant tape suitable for use in the placement of automotive windshields are onerous. While sealant tapes possessing many of the above properties have been known, no tape has been produced which satisfies all of the requirements.

It is an object of the present invention to provide thermosensitive compositions from which may be produced sealant tapes satisfying all of the above requirements.

The present invention therefore provides a thermosensitive composition suitable for use in sealant tapes which comprises a mixture of (a) 100 parts by weight of a natural or synthetic elastomeric polymer, (b) 5 to 100 parts by weight of a resinous polymer compatible with the elastomeric polymer (a), (c) 1 to 75 parts by weight of finely divided metal particles, (d) up to 150 parts by weight of a filler and (e) up to 500 parts by weight of a plasticizer compatible with said elastomeric polymer. These compositions are non-curing and can have virtually unlimited shelf-life at normal temperatures.

Component (a) of the compositions of the invention is a natural or synthetic elastomeric polymer. Examples of suitable such materials are natural rubber and such synthetic rubbers as styrene/butadiene copolymers (SBR rubbers), acrylonitrile/butadiene copolymer (NBR rubbers), isobutylene homopolymers or copolymers containing a minor amount of a copolymerized diolefin, ethylene/propylene copolymers which may contain a minor amount of a polymerized diolefin, polychloroprene, polyisoprene, or polybutadiene.

In general the synthetic elastomeric materials can be prepared by polymerizing a monomer or mixture of monomers in a conventional emulsion polymerization system. They can also be prepared in a solution polymerization system using an organometallic compound, such as a lithium alkyl or aluminium alkyl in combination with a transition metal compound.

Preferably the component (a) should have good aging properties and, in particular, should have good resistance to ozone. For this reason the preferred materials used as component (a) are rubbery isobutylene homopolymers or copolymers or rubbery ethylene/propylene copolymers.

The preferred isobutylene polymer is a rubbery copolymer of isobutylene with a minor proportion of a diolefin of from 4 to 14 carbon atoms. Such copolymers may be referred to as "butyl" rubbers. The preferred diolefin which is copolymerized with isobutylene is isoprene but other diolefins may be used such as, for example, butadiene, dimethyl butadiene and pentadiene. In general the copolymers contain from 85 to 99.5 parts by weight of isobutylene and 15 to 0.5 parts by weight of the diolefin. They are normally produced by a low temperature polymerization using a solution of a Friedel-Crafts catalyst, such as aluminium chloride, in a low freezing solvent such as methyl or ethyl chloride at temperatures of from −10° to −100° C. or below. The copolymers thus obtained usually have molecular weights in the range 200,000 to 600,000. The type of butyl rubber and the proportion present in the composition can determine the properties of shear strength and tack of the final composition and hence its suitability for a particular application.

The rubbery ethylene/propylene copolymers which are desirably used in the compositions of the invention can be prepared by copolymerizing ethylene and propylene and optionally a diolefin in the presence of Ziegler catalysts at relatively low temperatures and pressures. Suitable copolymers contain from 20 to 75 mole percent ethylene and may contain up to 5 mole percent of polymerized diolefin, such as dicyclopentadiene or ethylidene norbornene.

Mixtures of the various elastomeric polymers may be used as the component (a) in the compositions of the invention.

Component (b) of the compositions comprises from 5 to 100 parts by weight, preferably 5 to 25 parts by weight, per hundred parts by weight of component (a), of a resinous polymer compatible with the elastomeric polymer (a). Suitable such resinous polymers include polyethylene, polypropylene, polyvinyl chloride, ethylene/propylene copolymers containing more than 80 mole percent ethylene, ethylene/vinyl acetate copolymers, trans 1,4-polyisoprene and trans 1,4-polybutadiene. The resinous polymers should be compatible with the elastomeric polymer (a) and of sufficiently high molecular weight that the polymer is solid at room temperature. The resinous polymers confer strength on the thermosensitive compositions of the invention and are effective in preventing cold flow of the compositions.

The preferred such resinous polymer is an ethylene/vinyl acetate copolymer containing from 20 to 40, especially 25 to 35, mole percent of vinyl acetate. Such copolymers enable compositions to be formulated which have maximum toughness, hot tack and flexibility and which exhibit high melt viscosities. All of these properties are desirable in the thermosensitive compositions of the invention. Polyethylene and polypropylene resinous polymers may be used to advantage in view of their efficacy in preventing cold flow of the compositions of the invention. Low density polyethylene is a preferred grade of polyethylene to use in view of its low cost and its good low temperature flexibility.

Component (c) of the compositions of the invention comprises from 1 to 75 parts by weight, especially from 5 to 25 parts by weight, per hundred parts by weight of component (a), of finely divided metal particles. The particle size of the metal is not critical but for ease of dispersion during the mixing of the ingredients of the thermosensitive compositions the particles are preferably such as will pass through a U.S. Standard Sieve mesh 50, and especially through a mesh 200. One of the requirements of the metal particles is that they should conduct heat readily and metals having good thermal conductivity are therefore preferred. Preferably also the metal is one which has good resistance to corrosion. Aluminum and copper powders have been found especially suitable with aluminum powder of 200 or 400 mesh being preferred. The amount of metal particles used will depend in part upon the fineness of the particles and upon the metal chosen but should not be such that the composition becomes unduly stiff and unworkable.

Component (d) of the compositions of the invention comprises up to 150 parts by weight, especially 50 to 100 parts by weight, of a filler which may be reinforcing or non-reinforcing but which is preferably the former. As with the metal particles, the particles size is not important but the particles should be sufficiently small to make compounding simple.

Examples of suitable fillers include various types of reinforcing carbon blacks, whether alone or in the form of mixtures, such, for example, as easy processing channel (EPC), medium processing channel (MPC), hard processing channel (HPC), semi-reinforcing furnace (SRF), medium abrasion furnace (MAF), reinforcing furnace (RF), high abrasion furnace (HAF), medium thermal (MT), fine thermal (FT), and the like.

Non-black fillers may also be used and examples include ferric oxide, magnesium carbonate, lithium dioxide, zinc oxide, aluminum hydroxide, slate dust, zinc peroxide, zinc chloride, lead peroxide, lead oxide, chlorinated paraffins, glue, talc, barytes, lithopone, various clays such as Dixie clay, McNamee clay and pyrophillite, finely divided silica and whiting.

Component (e) of the compositions of the invention comprises up to 500 parts by weight, especially 5 to 25 parts by weight, of a plasticizer compatible with the elastomeric polymer component (a). In general any such compatible plasticizer as is conventionally used in rubber compounding may be employed in the thermosensitive compositions of the invention. Thus there may be used various hydrocarbon oils such as those obtained by catalytic cracking and dehydrogenation operations; extract oils from solvent extraction of lubricating oil stocks with, for example, furfural or phenol; oil from alkylation reactions; polymers from the clay tower treamtent of cracked gasolines; resins such as coumarone-idene resins; esters, such as alkyl phthalates and sebacates; coal tar products and vegetable oils, such as castor oil. Naphthenic oils and paraffinic oils are especially suitable as also are liquid polybutenes having, for example, average molecular weights in the range 300 to 2600. Mixtures of the various plasticizers may also be used.

The thermosensitive compositions of the invention may also, if desired, contain additional ingredients. Thus, for example, they may contain blowing agents which upon heating, liberate a gas or mixture of gases which expand or "blow" the composition into a foam structure. Suitable such blowing agents are ammonium and sodium carbonates and bicarbonates and nitrogen-liberating compounds such as azocompounds, for example, azodicarbonamide or azo bis isobutyronitrile, and hydrazides, for example, benzene sulphohydrazide. Up to 10 parts by weight of such blowing agents may be incorporated per 100 parts by weight of the elastomeric polymer component (a).

The ingredients of the thermosensitive compositions may be mixed in any conventional manner. When they are mixed on a mill the temperature may, for example, be in the range 110° to 140° C., preferably about 120° C. The resinous polymer (b) may be banded first with a tight nip and the elastomeric polymer (a) then added slowly with nip adjustment. The metal particles, filler and plasticizer can be added in order and the mixture refined thoroughly to give the desired uniformly mixed thermosensitive compositions of the invention. Alternatively, the ingredients may be mixed in an internal mixer, such as a Banbury mixer, when the following cycle can be followed. The mixer is heated to a suitable temperature, say 140° C., and the elastomeric polymer (a), resinous polymer (b) and metal particles are added first. After about 30 seconds the filler is added and the mixer is brushed after about 2½ minutes and again after about 3½ minutes. After about 4 minutes the mixture is the mixture is dumped and the plasticizer is added on a cold mill. The mixture is then thoroughly refined on the mill. The plasticizer is added on the mill as a precuation against foulding the Banbury chute.

In a preferred embodiment of the invention the thermosensitive compositions are made up into direct glazing sealant tapes suitable for use in the installation of automotive windshields and which comprise an electrically conducting core embedded in a matrix of the thermosensitive composition. The passage of the electric current through the core generates heat which softens the thermosensitive composition, decreases the compression resistance and facilitates the installation of, for example, an automotive windshield. The fall in compression resistance is temperature dependent and thus may be adjusted as required for installation by temperature control, itself readily achieved by either voltage control or time control when a current is passed through the tape core. On interruption of the electric current the tape cools down and resumes its original consistency.

While the tapes may be of any cross-section they are preferably of circular cross-section and comprise a wire of electrically conducting material embedded, preferably axially, in a sheath of the composition. The tapes may be of any suitable thickness, for example, from 0.2 to 0.4 inch. Tapes having a diameter of about ⅜ inch (0.95 cm.) and having a copper wire passing axially therethrough have been found to be particularly suitable for use in the installation of automotive windshields. Such tapes may be made quite readily using a cross-head extruder. To do this the thermosensitive composition stock is prewarmed on a warmup mill and is then strip-fed to the cross-head die of the extruder. Suitable barrel and the die temperatures are 105° to 115° C. The conducting core, usually in the form of a wire, is fed to the cross-head attachment in the usual manner and the composition is extruded in such a way as to surround and embed the conducting core.

The sealant tapes produced in accordance with the invention are rubbery, non-curing and possess minimal self-sticking tendencies. Thus, unwrapped samples may be stored in coils at 72° F. (22° C.) and 40% humidity for periods up to three months and longer and yet be uncoiled without difficulty. From this it can be seen that packaging of the tapes causes no special problems and no wrapping need be provided. Nevertheless, because of the slight tack which the tapes may possess it is recommended to wrap the tapes in a suitable inert film of, for example, polyethylene. The sealant tapes retain their thermosensitive character for virtually unlimited periods at ordinary temperatures.

In a further aspect, the invention provides a method of bonding which comprises connecting the electrically conducting core of a sealant tape of the invention to a source of electricity, passing an electric current through the core for a time sufficient to soften the thermosensitive matrix of the tape, pressing the surfaces to be bonded into the softened matrix and allowing the uncured matrix to cool to ambient temperature. Preferably the surfaces to be bonded comprise an automotive windshield on the one hand and, on the other hand, the automotive windshield seat or frame in the automotive body. The sealant tape may be applied either to the windshield or to the windshield seat before being connected to the source of electricity. The latter will usually be the more convenient. To improve the adhesion of the sealant tape to the windshield or seat a primer composition may be used. The windshield may be pressed into place over the softened sealant tape while the current is passing but since the tape can maintain a softened condition for an appreciable period of time the passage of current may be interrupted before the windshield is finally positioned. In order to secure shorter periods for the passage of electric current it is possible to preheat the sealant tapes of the invention other than by passing a current through the conductive core, for example, by placing in an oven. The preheating should not be so prolonged or of such temperature that handling problems are caused by increased tack or flow of the thermosensitive matrix.

In a preferred embodiment the method of the invention comprises the installation of automotive windshields and the like by applying a primer composition to the inner edge of the windshield and to the windshield seat and allowing it to dry, applying to the windshield seat a direct glazing tape of the invention from each end of whch projects sufficient of the conducting core to enable electrical contact to be made with a source of electric power, the tape being applied in such a manner that the thermosensitive matrix will fill the windshield seat when the ends of the glazing tape are pressed into place, connecting the projecting portions of the conducting core to a source of electric power, passing current through said core for sufficient time to soften the thermosensitive matrix and reduce the compression resistance thereof to below 225 lbs. (102 kg.) per cell, disconnecting the power supply, placing the ends of the tape into place in the windshield seat to leave no clearance therebetween, and positioning the windshield over the windshield seat and pressing it into place while the matrix is in a softened condition. The projecting portions of the core may be pressed into the softened matrix, cut off or left projecting. If they are left projecting, they may be used to reheat the uncured tape by again passing current through the core so facilitating removal or replacement of the windshield.

Any suitable primer composition may be used to improve the adhesion of the sealant tape to the automotive windshield and to the windshield seat or aperture. Preferably, however, the primer comprises a solution in a volatile solvent of the thermosensitive composition and of a silane having substituent groups capable of reacting or interacting with the glass of the windshield on the one hand, and, on the other hand, with the thermosensitive matrix of the sealant tape. Particularly suitable compositions comprise 100 parts by weight of the thermosensitive composition and 1 to 15 parts by weight of a silane having at least one terminal group hydrolyzable by water to a silanol group and at least one terminal organic group which is not hydrolyzable by water, in the form of a solution in volatile solvent containing 10 to 40 percent by weight solids. Silanes which may be used are those having at least one $C_1$-$C_4$ alkoxy or acyloxy group attached to the silicon atom and having at least one group which can interact with the thermosensitive composition, such as vinyl, aminoalkyl, substituted aminoalkyl, haloalkyl, epoxyalkoxyalkyl, or acyloxyalkyl. Examples of such silanes are 3-methacryloxypropyl trimethoxy silane, 3-glycidyloxypropyl trimethoxy silane, 3-aminopropyl diethoxy methoxy silane, 3-N-($\beta$-aminoethyl) aminopropyl trimethoxy silane, vinyl triacetoxy silane and 3-chloropropyl trimethoxy silane.

The invention is illustrated by the following examples in which all parts and percentages are by weight unless otherwise specified.

EXAMPLE 1

A thermosensitive composition was formulated by mixing in a Banbury (initially at 138° C.) and then on a cold mill, the following ingredients:

| Ingredient: | Parts |
|---|---|
| (a) Butyl rubber | 100 |
| (b) Ethylene/vinyl acetate copolymer | 15 |
| (c) Aluminum powder (200 mesh) | 15 |
| (d) SRF Carbon Black | 75 |
| (e) Polybutene | 10 |

[The butyl rubber (a) is a copolymer of isobutylene and isoprene containing a no-staining stabilizer, having about 2.2 mole percent unsaturation and a viscosity (ML–4' at 100° C.) of about 45. The ethylene/vinyl acetate copolymer (b) contains 27 to 29% vinyl acetate, has a density of 0.954 gm./cc., an inherent viscosity of 0.94 (when measured at 30° C. as a solution containing 0.25 gm. in 100 ml. of toluene) and a softening point (Ring and Ball) of 155° C. The polybutene (e) is a highly viscous liquid having a pour point of $-6.7°$ C., an average molecular weight of about 890, a specific gravity of 0.89 and a viscosity of 1080 Saybolt universal seconds at 100° C.]

The ingredients (a), (b) and (c) of the composition were added to the Banbury mixer initially and the ingredient (d) was added after 30 seconds had elapsed. The mixer was brushed after 2.5 minutes had elapsed and again after 3.5 minutes had elapsed. The mixing cycle in the Banbury was complete after 4 minutes. The plasticizer ingredient (e) was added to the mixture on a cold mill and the entire mixture was then refined several times.

The composition was then subjected to a variety of tests to determine its physical properties as follows:

Solids content.—Determined in accordance with ASTM procedure D553 except that the composition was heated for three hours at 102°±3° C. in a mechanical convection oven.

Ash content.—The sample remaining after the solids content had been determined was placed in a cool muffle furance which was then slowly heated to and maintained at 780±30° C. for one hour after which the sample was cooled in a desiccator and weighed.

Specific gravity was measured by a hydrostatic method, in accordance with the ASTM procedure D297.

Sag or flow.—Two similar 20 cm. long strips of 1 cm. x 1 cm. tape made from the thermosensitive composition were applied parallel to each other upon the upper surface of a cleaned glass plate 7.5 cm. x 24 cm. x 0.6 cm. A cleaned, enamelled steel panel 7.5 cm. x 24 cm. was placed on top of and in contact with the strips of thermosensitive composition. The assembly was compressed in a laboratory press such that the daylight opening between the glass plate and the steel plate was 0.5±0.05 cm. thick. The test piece was then clamped to prevent any independent movement of the glass or enamel and, without removing the clamps, was conditioned first for 24 hours at room temperature (22°±3° C.) and then for two weeks at 88°±1° C. in an air circulating oven. During the conditioning the test piece was placed on edge with the long axis parallel with the bottom of the oven. After the conditioning the strips of the composition were examined for any sag below the position in which they were applied.

Yield strength.—An assembly was prepared similar to that used in the test for sag or flow except that the glass and steel plates were each 7.5 cm. square and the strips of tape were 7.5 cm. long. The test piece was then conditioned as specified in Table I which follows and the yield strength of the bonded assemblies was determined in tension by pulling in a tensile machine with a jaw separation rate of 2 cm./minute.

Shear strength.—Test pieces were prepared as described for yield strength but the plates were separated by pulling in a direction parallel with the plates to produce shear.

Staining.—A 15 cm. length of tape was placed in intimate contact with a 7.5 cm. x 18 cm. piece of white vinyl headliner fabric and the assembly was exposed to ultraviolet light for 200 hours. After exposure the fabric was examined for staining.

Paint compatibility.—A 15 cm. length of tape was placed in intimate contact with a 7.5 cm. x 23 cm. enamelled panel and the assembly was exposed to a temperature of 88°±1° C. for two weeks. After exposure the tape was removed and the contact area and adjacent area were examined for staining, pinholing or blistering.

Low temperature flexibility.—A 15 cm. length of tape was conditioned for two weeks at 88°±1° C. and then in a cold chamber for four hours at −29° C. after which the sample was bent 180° around a mandrel 2.5 cm. in diameter maintained at −29° C.

Heat resistance.—A bonded test piece similar to that described in the test for yield strength was heated at 135° C. for 45 minutes.

Ozone resistance.—A specimen of tape was stretched 25–35% on a suitable mandrel and was conditioned for one day at room temperature in an ozone-free atmosphere. The specimen was then exposed to 50 p.p.h.m. ozone for 70 hours at 38°±3° C. and afterwards examined under 2× magnification for cracking.

Compression-recovery characteristics.—A test assembly was prepared as for the test on yield strength except that both the plates were of glass. The initial force required to compress to a daylight gap of 0.5±0.05 cm. was measured as was the residual force after 1 minute. The compressive force was removed and the thickness of the specimen measured by dial micrometer after 5 minutes and 2 hours.

Fatigue resistance.—A test assembly was prepared similar to that in the test on yield strength and the metal plate was fixedly clamped in position. The assembly was then flexed at the rate of 660 cycles/minute about the bond line a total of 0.15 cm. (±0.075 cm. from the normal position) by means of an oscillating clamp fixed to the glass fibre. During the test water was applied to the bond area in such a manner as to maintain a continuous film of water over the entire length of the bond.

The results of these tests on the composition described above and on thermosensitive tapes made therefrom are given in Table I together with the requirements for automotive sealant tapes laid down by a major automobile manufacturer.

TABLE I

| Property | Value for composition of Example 1 | Requirement of motor manufacturer |
|---|---|---|
| Solids (percent) | 99.5 | 99 minimum. |
| Ash (percent) | 7.5 | 13 maximum. |
| Specific gravity | 1.13 | 1.05–1.15. |
| Sag or flow at 88° C. | Pass | 116″ maximum. |
| Unaged hardness—Shore A | [1] 65 | 20±5. |
| Aged hardness after: | | |
| (a) 2 weeks in air at 88° C. | 65 | 20±5. |
| (b) 2 weeks in water at 22° C. | 64 | 20±5. |
| (c) 500 hrs. in moist air at 38° C. | 67 | 20±5. |
| (d) 500 hrs. in Weatherometer | 68 | 20±5. |
| (e) 500 hrs. in ultraviolet light at 63° C. | 67 | 20±5. |
| Unaged yield strength (kg./cm.$^2$) | 4.0 | 0.84 minimum. |
| Aged yield strength (kg./cm.$^2$) after: | | |
| (a) 2 weeks in air at 88° C. | 4.5 | 1.12 minimum. |
| (b) 2 weeks in water at 22° C. | 4.7 | 1.12 minimum. |
| (c) 500 hrs. in moist air at 38° C. | 4.7 | 1.12 minimum. |
| (d) 500 hrs. in Weatherometer | 4.0 | 1.12 minimum. |
| (e) 500 hrs. in ultraviolet light at 63° C. | 4.1 | 1.12 minimum. |
| Staining on vinyl headliner | Pass | No staining. |
| Paint compatibility | Pass | No staining, pinholing or blistering. |
| Low temperature flexibility | Pass | No cracking at −29° C. |
| Heat resistance at 135° C. | Pass | No flow, plasticizer migration or loss of adhesion. |
| Ozone resistance | Pass | No cracking. |
| Compression recovery at 22° C.: | | |
| Force to compress (kg./cell) [2] | 192 | 102 maximum. |
| Residual load (kg./cell) | 60 | 13.6 maximum. |
| Rebound height (cm.) after: | | |
| 5 minutes | 0.65 | 0.66 maximum. |
| 2 hours | 0.65 | 0.70 maximum. |
| Fatigue resistance [3] (cycles to failure): | | |
| Unaged | 450,000 | No failure after 100,000 cycles. |
| Aged 2 weeks in air at 88° C. | 403,000 | |
| Aged 2 weeks in water | 428,000 | |
| Aged 500 hours at 100% relative humidity | 473,000 | |

[1] Hardness under application conditions—18 Shore A.
[2] See Table II for full data on compression recovery.
[3] Samples conditioned 2 days at 22° C. at 40% relative humidity.

It can be seen from this summary of properties that the compositions of the invention and tapes made therefrom easily satisfy all the requirements for automotive sealant tapes with the exception of those on hardness and compression recovery properties. The reason for this is that the sealant tapes of the invention are intended to be applied in a different manner than the sealant tapes hitherto used. Previously, sealant tapes, for example normally tacky tapes based on butyl rubber, have relied on their tack at normal temperatures and have in consequence been soft, readily compressible materials somewhat difficult to package and handle. By way of contrast the tapes of the invention, although possessing the necessary degree of self-locating tack to make windshield installation simple, only develop their full adhesive properties and become sufficiently compressible to yield to the compressive force applied by a windshield during installation upon heating to an elevated temperature. This, as explained previously, is readily achieved by passing an electric current through the conducting core of the tape to generate heat.

EXAMPLE 2

In Table II which follows are given the compression characteristics for a sealant tape made in accordance with the invention from the composition described in Example 1 and comprising a rubbery cord of circular cross-section, diameter 0.95 cm., and having a copper resistance wire of 22 gauge (American Wire Gauge) running therethrough (16 ohms/305 m.). Assuming such a tape of length 4.9 metres and a voltage of 24 volts (such a voltage can readily be used without hazard to operating personnel), the current is 34.3 amps and a heating time of 45 seconds is sufficient to generate an equilibrium wire temperature of 450° C. and to soften the tape sufficiently for installation to be made simple.

TABLE II

| Test temperature [1] (° C.): | Force to compress (kg./cell) | Residual load (kg./cell) | Rebound height (mm.) at— | |
|---|---|---|---|---|
| | | | 5 min. | 2 hrs. |
| 22 | 192 | 60 | 6.5 | 6.8 |
| 38 | 147 | 41 | 6.7 | 6.7 |
| 55 | 123 | 33 | 5.9 | 6.1 |
| 70 | 93 | 20 | 5.6 | 5.6 |
| 100 | 60 | 10 | 5.4 | 5.4 |
| 121 | 43 | 6.4 | 5.3 | 5.4 |
| Heating time [2] (seconds): | | | | |
| 40 | 86 | 16 | 5.5 | 5.6 |
| 50 | 51 | 9.1 | 5.4 | 5.4 |
| 60 | 41 | 9.1 | 5.3 | 5.4 |
| Requirement of motor manufacturer (max.) | 102 | 14 | 6.6 | 7.0 |

[1] Test assembly heated to temperature indicated.
[2] Sample heated by passing current through resistance wire.

As can be seen from these results the compression resistance of the thermosensitive tapes of the invention can be altered without changing the compound formulation merely by adjusting the temperature. Significantly the compression properties of the tapes after a heating time of only 40 seconds are well within the requirements for these properties.

EXAMPLES 3-6

Thermosensitive compositions were formulated as in Example 1 by mixing the following ingredients:

| Example | 3 | 4 | 5 | 6 |
|---|---|---|---|---|
| (a) Butyl rubber | 100 | 100 | 100 | 100 |
| (b) Ethylene/vinyl acetate copolymer | 15 | 25 | 15 | 25 |
| (c) Aluminum powder (200 mesh) | 15 | 10 | 5 | 20 |
| (d) SRF Carbon Black | 75 | 75 | 75 | 75 |
| (e) Polybutene | | 80 | 25 | |
| (f) Dixie clay | 20 | 20 | 10 | |
| (g) Polyterpene resin | 20 | 20 | 20 | 20 |

The ingredients (a) to (e) were the same as the ingredients used in the composition of Example 1. Ingredient (f) is a hard clay of specific gravity 2.62 and of a fineness such that 99.8% of the particles pass through a 325 mesh screen. Ingredient (g) was a thermoplastic polyterpene resin which is soluble in aromatic hydrocarbons, aliphatic alcohols, ketones and esters, and chlorinated hydrocarbons, and which has a melting point (Ball and Ring) of 115° C.

The compositions 3 to 6 and sealant tapes made therefrom were tested in accordance with the procedures outlined in Example 1 and were found to satisfy all the various requirements for compositions and tapes with the exception of those on hardness and compression. However, when sealant tapes were made in accordance with the invention from the compositions and were heated by passing electric current through the axial wire, then it was found that the desired hardness and compression recovery properties could readily be achieved upon passing current for periods of from 35 to 60 seconds. With these properties, the tapes of the invention enable automotive windshields to be installed readily and securely without danger of glass breakage.

The ingredients (a) to (f) were the same as the ingredients used in the preceding examples. Ingredient (h) is an isoprene/acrylonitrile rubbery copolymer containing about 31% acrylonitrile, having a Mooney viscosity (ML-4' @ 100° C.) of about 70 and available as KRYNAC 833 from Polymer Corporation Limited. Ingredient (i) is a polymer of 2-chlorobutadiene 1,3 having a specific gravity of 1.25±0.03 and available as Neoprene WRT from E. I. du Pont de Nemours & Co. Ingredient (j) is a resinous polymer, trans-polyisoprene having a Mooney viscosity (ML-4' @ 100° C.) of 30 and available as TRANS-PIP from Polymer Corporation Limited. Ingredient (k) is a polyethylene of melt index 25.0 gm./10 minutes (when measured in accordance with ASTM D1238-62T) and available as CIL 1250H from Canadian Industries Limited. Ingredient (l) is a polyvinyl chloride resin available as GEON 121 from B. F. Goodrich Chemical Co. Ingredient (m) is an ester plasticizer. Ingredient (n) is a rubbery ethylene/propylene/diene polymer of moderate molecular weight available as ROYALENE 301 from Uniroyal, Inc.

Sealant tapes according to the invention were prepared from each of the compositions of Examples 7 to 18 and were found to be suitable for use in the installation of automotive windshields.

While the thermosensitive compositions and sealant tapes of the invention have been discussed primarily with reference to their use in the installation of automotive windshields, it is apparent that they may be used in other applications. Thus, they may be used also as, for example, laminating compounds for automobile roof trims, sealing gaskets for clay pipe joints and as sealing gaskets for highway expansion joints.

We claim:

1. A sealant tape which comprises an electrically conducting core embedded in a matrix of a non-curing composition which comprises a mixture of:
   (a) 100 parts by weight of a synthetic elastomeric polymer selected from rubbery homopolymers and copolymers of isobutylene and rubbery ethylene/propylene copolymers,
   (b) 5 to 100 parts by weight of a resinous polymer compatible with the elastomeric polymer (a), and of sufficiently high molecular weight that the polymer is solid at room temperature,
   (c) 1 to 75 parts by weight of finely divided metal particles,
   (d) up to 150 parts by weight of a filler,
   (e) up to 500 parts by weight of a plasticizer compatible with said elastomeric polymer,
said thermoplastic composition being rubbery, substantially non-tacky and dimensionally stable at a temperature of about 22° C. and having a low compression resistance at a temperature of at least about 70° C.

2. A sealant tape as claimed in claim 1 which is of substantially circular cross-section and comprises a wire of electrically conducting material embedded in a sheath of the non-curing composition.

3. A sealant tape according to claim 1 wherein the elastomeric polymer is a butyl rubber.

4. A sealant tape according to claim 1 wherein the

EXAMPLES 7-18

Thermosensitive compositions were formulated as in Example 1 by mixing the following ingredients:

| Ingredient | Examples | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| (a) Butyl rubber | | | | | 100 | 100 | 100 | 100 | 100 | 100 | 100 | 100 |
| Natural Rubber (SS #1) | 100 | | | | | | | | | | | |
| (h) Isoprene/acrylonitrile rubbery copolymer | | 100 | | | | | | | | | | |
| (i) Polychloroprene | | | 100 | | | | | | | | | |
| (n) Ethylene/propylene rubbery copolymer | | | | 100 | | | | | | | | |
| (b) Ethylene/vinyl acetate copolymer | 15 | 15 | 15 | 15 | | | | | | 15 | 15 | 15 |
| (j) Transpolyisoprene | | | | | 5 | 100 | | | | | | |
| (k) Polyethylene | | | | | | | 5 | | | | | |
| (l) Polyvinylchloride | | | | | | | | 5 | | | | |
| (c) Aluminum powder | 15 | 15 | 15 | 15 | 15 | 15 | 15 | 15 | | | | |
| (f) Dixie clay | | | | | | | | | 15 | 15 | 15 | 15 |
| (d) SRF Carbon Black | 75 | 75 | 75 | 75 | 75 | 75 | 75 | 75 | 50 | 100 | | |
| (e) Polybutene | 10 | 10 | 10 | 10 | 10 | 10 | 10 | 10 | 10 | 10 | 75 | 75 |
| (m) Di-isooctyl adipate | | | | | | | | | | | 10 | 20 | resinous polymer is selected from the group consisting of polyethylene, ethylene/propylene copolymer containing more than 80 mole percent of ethylene, vinyl acetate copolymer and polyvinylchloride.

5. A sealant tape according to claim 4 wherein the resinous polymer is an ethylene/vinyl acetate copolymer containing from 20 to 40 mole percent vinyl acetate.

6. A sealant tape according to claim 1 wherein the finely divided metal particles are of aluminum.

7. A sealant tape which comprises an electrically conducting core embedded in a matrix of a non-curing composition which comprises a mixture of (a) 100 parts by weight of a butyl rubber, (b) 5 to 25 parts by weight of an ethylene/vinyl acetate copolymer containing from 20 to 40 mole percent vinyl acetate, (c) 5 to 25 parts by weight of aluminium power, (d) 50 to 100 parts by weight of a carbon black and (e) 5 to 25 parts by weight of a plasticizer compatible with said butyl rubber.

8. A sealant tape according to claim 7 which comprises a wire of electrically conducting material embedded axially in a matrix of the non-curing composition.

References Cited

UNITED STATES PATENTS

| | | | |
|---|---|---|---|
| 2,956,606 | 10/1960 | Beck et al. | 156—275 |
| 3,202,596 | 8/1965 | Canevari | 156—275 |
| 3,263,268 | 8/1966 | Flaherty | 156—275 |
| 3,378,672 | 4/1968 | Blumenkranz | 156—275 |
| 3,388,945 | 6/1968 | Kevelin et al. | 156—273 |
| 3,398,044 | 8/1968 | Plueddemann | 156—272 |
| 3,406,055 | 10/1968 | Rubel | 156—275 |
| 3,468,747 | 9/1969 | Tatnall | 156—275 |
| 3,506,519 | 4/1970 | Blumenkranz | 156—275 |

JOHN T. GOOLKASIAN, Primary Examiner

G. W. MOXON II, Assistant Examiner

U.S. Cl. X.R.

117—128.4, 128.7, 232; 156—272, 273; 161—217, 218